UNITED STATES PATENT OFFICE.

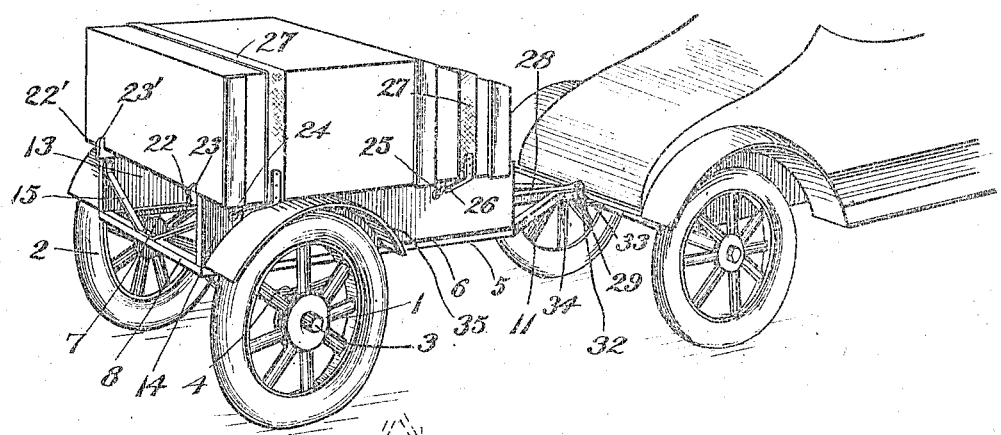
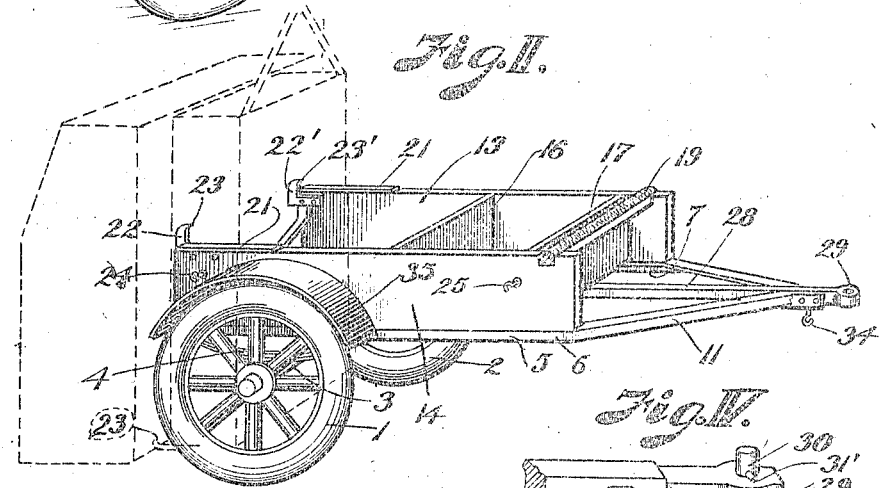
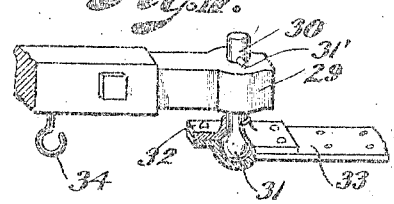
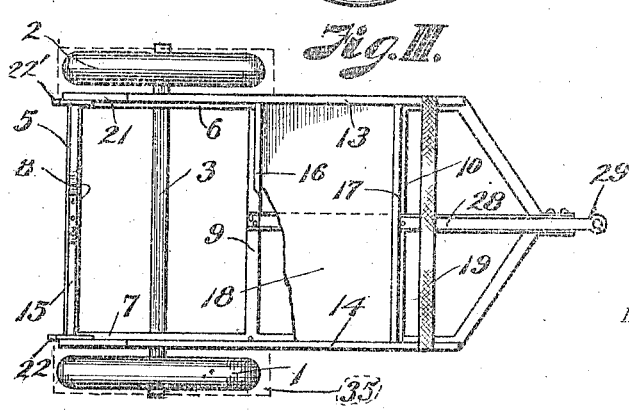

OSCAR C. POTTS, OF UNIONVILLE, MISSOURI.

TRAILER-TRUCK.

1,255,222.  Specification of Letters Patent.  Patented Feb. 5, 1918.

Application filed April 22, 1916. Serial No. 93,005.

*To all whom it may concern:*

Be it known that I, OSCAR C. POTTS, a citizen of the United States, residing at Unionville, in the county of Putnam and State of Missouri, have invented certain new and useful Improvements in Trailer-Trucks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to trailer trucks and more particularly to a device of this character that is especially adapted for the transportation of pianos or the like, the principal object of the invention being to provide a truck upon which a piano may be quickly and easily loaded and safely transported.

In accomplishing this object I have provided improved details of structure the preferred forms of which are illustrated in the accompanying drawings, wherein:—

Figure I is a perspective view of a trailer truck embodying my invention, showing a piano mounted thereon and illustrating the manner of connecting the truck with a motor driven vehicle.

Fig. II is a perspective view of the trailer truck, showing in dotted lines the manner of loading a piano thereon.

Fig. III is a plan view particularly illustrating the body framework of the truck.

Fig. IV is a detail perspective view of the coupling members.

Referring more in detail to the drawings:—

1 and 2 designate the ground wheels which are of the usual type used in motor vehicle construction and 3 a connecting axle on which the wheels are suitably mounted.

Supported by the axle 3, through the intermediacy of side springs 4, is a body frame 5 which is preferably of angle iron construction and comprises the side members 6—7, and end member 8 and central and forward cross bars 9—10; the side members being extended forwardly and brought together to form a tongue 11 whereby the trailer may be drawn.

Mounted on the frame members 6—7 are side boards 13—14, which are of sufficient height that a piano or the like when mounted thereon will clear the wheels 1—2 and not interfere with the travel thereof.

The side boards are secured at their lower edges to their supporting members and are held rigidly upright by brace rods 15 which are secured to the cross members 8 and to the upper edges of the said boards and also by cross boards 16—17 near the front of the truck which with the bottom member 18 form a compartment which is suitable for carrying small trucks, ropes and other piano accessories which are necessary in moving instruments in and out of houses.

I also place a cross bar 19, having a padded upper face, near the forward ends of the side members, and provide leather strips 21 along the rear upper edges of the said side members, so that if an uncovered piano should be carried by the truck its surface would not be marred should it slip thereon.

Bolted to the side boards 6—7 at the rear upper corners thereof are hooks 22—22' having points 23—23' extending upwardly above the level of the said boards and near the forward and rear ends of the side members are hooks 24—25, which are adapted for receiving the rings 26 of binding strips 27, whereby a piano may be securely fastened on the truck. By placing the hooks 22—22' in this manner, when it is desired to load a piano on the truck, the truck body is tipped from its upright position (dotted lines Fig. II), so that the hook ends 23—23' may be projected beneath the lower edge of the piano or the box within which it is contained, and after strapping the piano or box to the truck body, the same is tipped backwardly to position the same on the truck; the hooks also serving to prevent the piano box from slipping rearwardly from the truck body.

In order to connect the trailer with an automobile or other conveying vehicle, I provide an extended tongue 28 which is secured to the cross members 9—10 and extends forwardly between the side members 6—7 and to which the same are attached. At the forward end of the tongue 28 is an eye member 29 which is adapted for receiving a pin 30, having a ball end 31 for seating between socket members 32—33 which may be secured in a suitable manner to a conveying vehicle, and the pin 30 being secured within the eye member 29 by a cotter pin or bolt 31'

I also provide a hook 34 near the forward end of the tongue for receiving a tackle hook or the like, to assist in loading as will presently be described, and fenders 35 for covering the wheels 1—2 so that mud or water can not be thrown from the road against the piano or its covering.

Presuming the device to be so constructed, if it is desired to load a piano thereon, the truck body is tipped backwardly, so that it will stand in an upright position and the hooks 22—22' may be projected beneath the base of the piano. The piano is then strapped to the body by the strips 27 and the truck tipped back to its natural position carrying the piano therewith; the tipping may be done manually by drawing forwardly and downwardly on the tongue or more easily by anchoring one end of a tackle rope to the hook 34 and the other end to the conveying vehicle, so that the truck may be tipped forwardly.

While I have shown a boxed piano strapped to a truck, it is apparent that the piano could be loaded on the truck uncovered and that the padded bar and side boards will prevent scratching or marring the back of the piano.

By so constructing the device it will be seen that a piano can quickly and easily be loaded or unloaded and that the truck may be coupled to an automobile and quickly and safely transported.

Having thus described my invention what I claim as new therein and desire to secure by Letters-Patent, is:—

A two wheeled trailer truck comprising a body frame having spaced side members drawn inwardly at their forward ends, cross bars connecting said side members, a forwardly extended tongue secured to said cross members and braced by said inwardly drawn side members, vertically mounted side boards secured on the said frame, hooks at the upper rear corners of said side boards, fastening devices on the outer faces of said side boards and an eye member at the forward end of said tongue adapted for receiving a pin on a draft vehicle for the purpose set forth.

In testimony whereof I affix my signature.

OSCAR C. POTTS.